(12) United States Patent  
Regan et al.

(10) Patent No.: US 10,638,667 B2  
(45) Date of Patent: May 5, 2020

(54) AUGMENTED-HUMAN FIELD INSPECTION TOOLS FOR AUTOMATED PHENOTYPING SYSTEMS AND AGRONOMY TOOLS

(71) Applicant: X Development LLC, Mountain View, CA (US)

(72) Inventors: William Regan, San Carlos, CA (US); Matthew Bitterman, Mountain View, CA (US); David Brown, San Francisco, CA (US); Elliott Grant, Woodside, CA (US); Zhiqiang Yuan, San Jose, CA (US)

(73) Assignee: X Development LLC, Mountain View, CA (US)

( * ) Notice: Subject to any disclaimer, the term of this patent is extended or adjusted under 35 U.S.C. 154(b) by 317 days.

(21) Appl. No.: 15/854,607

(22) Filed: Dec. 26, 2017

(65) Prior Publication Data

US 2019/0191630 A1    Jun. 27, 2019

(51) Int. Cl.
*G06K 9/00* (2006.01)
*A01G 7/00* (2006.01)
(Continued)

(52) U.S. Cl.
CPC .............. *A01G 7/00* (2013.01); *A01G 22/00* (2018.02); *B64C 39/024* (2013.01); *G05D 1/0094* (2013.01); *G06K 9/66* (2013.01); *G06T 7/0004* (2013.01); *G06T 11/60* (2013.01); *G09B 5/06* (2013.01); *G09B 19/003* (2013.01);
(Continued)

(58) Field of Classification Search
CPC .......... A01G 7/00; A01G 1/001; A01G 22/00; B64C 2201/127; B64C 39/024; G05D 1/0094; G05D 2201/0201; G06K 9/66; G06K 9/00671; G06T 11/60;
(Continued)

(56) References Cited

U.S. PATENT DOCUMENTS 8,902,413 B2    12/2014    Ulman et al.
2010/0324830 A1*  12/2010  Solie ...................... G01N 21/55
                                                    702/19
(Continued)

OTHER PUBLICATIONS

Eagle, Bryan, "AgTech—Not Just for Large Farms?", published electronically May 6, 2017 at https://www.iotforall.com/agtech-large-farms/; May 6, 2017, last accessed Dec. 19, 2017, 9 pages.
(Continued)

*Primary Examiner* — Tom Y Lu
(74) *Attorney, Agent, or Firm* — Christensen O'Connor Johnson Kindness PLLC (57) ABSTRACT

Systems and Methods for Augmented-Human Field Inspection Tools for Automated Phenotyping Systems and Agronomy Tools. In one embodiment, a method for plant phenotyping, includes: acquiring a first set of observations about plants in a field by a trainer. The trainer carries a sensor configured to collect observations about the plant, and the first set of observations includes ground truth data. The method also includes processing the first set of observations about the plants by a trait extraction model to generate instructions for a trainee; and acquiring a second set of observations about the plants by a trainee while the trainee follows the instructions.

20 Claims, 8 Drawing Sheets

(51) Int. Cl.
*G09B 19/00* (2006.01)
*G09B 5/06* (2006.01)
*G06T 7/00* (2017.01)
*G06T 11/60* (2006.01)
*B64C 39/02* (2006.01)
*G05D 1/00* (2006.01)
*G06K 9/66* (2006.01)
*A01G 22/00* (2018.01)
*G09B 23/38* (2006.01)

(52) U.S. Cl.
CPC ........ *G09B 23/38* (2013.01); *B64C 2201/127* (2013.01); *G05D 2201/0201* (2013.01); *G06T 2207/30188* (2013.01)

(58) Field of Classification Search
CPC ........ G06T 2207/30188; G06T 7/0004; G09B 19/003; G09B 5/06; G09B 23/38; A01B 79/005
See application file for complete search history.

(56) References Cited

U.S. PATENT DOCUMENTS

| | | |
|---|---|---|
| 2015/0187109 A1 | 7/2015 | Mentzer |
| 2016/0019560 A1* | 1/2016 | Benkert ............. G06Q 30/0201 700/284 |
| 2017/0030877 A1* | 2/2017 | Miresmailli ............. A01G 7/00 |
| 2017/0223947 A1* | 8/2017 | Gall ................... G01N 21/4738 |
| 2019/0228839 A1* | 7/2019 | Heslot ..................... C12Q 1/68 |

OTHER PUBLICATIONS

Lapointe, Arob, "How AI and AR Apps can Change Agriculture", published electronically Nov. 18, 2016 at https://softwaredevelopersindia.com/blog/ai-ar-apps-can-change-agriculture/; Nov. 18, 2016, last accessed Dec. 19, 2017, 4 pages.

* cited by examiner

AUGMENTED-HUMAN FIELD INSPECTION TOOLS FOR AUTOMATED PHENOTYPING SYSTEMS AND AGRONOMY TOOLS

BACKGROUND

Plants are periodically observed in-field to estimate their size, stage of growth, sufficiency of watering, size of fruit, presence/absence of pests or disease, or other observable traits or characteristics. In response to the in-field observation, plant treatments are recommended and executed. Typically, in-field observers are relatively highly skilled, and use specialized tools for their observations. Some techniques of in-field observation in accordance with the conventional technology are described below with reference to FIGS. 1A-1C.

Figure 1A:
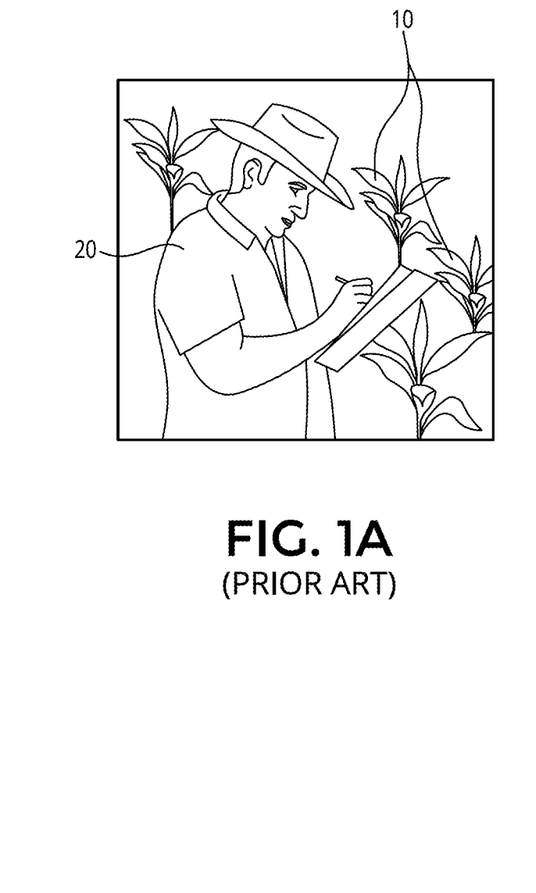
FIG. 1A is a picture of an observer making and recording observations in accordance with prior art technology.

FIG. 1A is a picture of an observer 20 making and recording observations in accordance with prior art technology. The observer 20 can be a farmer, a plant breeder, an agronomist, or other person possessing appropriate field observing skills. The observer 20 inspects plants 10, and records notes either in a paper notebook or an electronic device, for example, a handheld computer. However, this conventional method has limited throughput. Furthermore, even experienced human plant breeders can only understand and record a relatively small fraction of the attributes of plants in the field. Furthermore, this conventional technology often fails to capture even the readily available relevant data, for example, air temperature, time, exact location of a plant or plot of interest, etc.

Figure 1B:
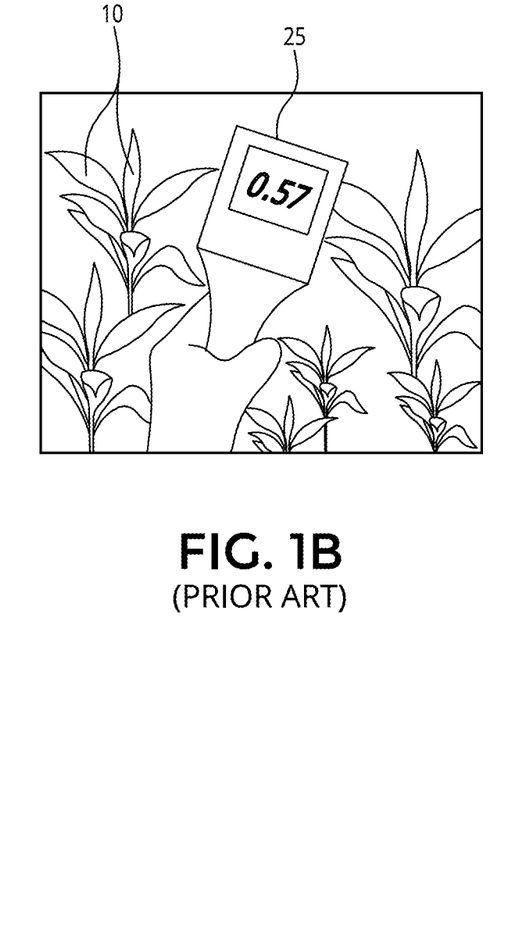
FIG. 1B is a picture of a handheld tool for assessing the health of plants in accordance with conventional technology.

FIG. 1B is a picture of a handheld tool 25 for assessing the health of plants in accordance with conventional technology. The illustrated handheld tool 25 is an optical tool that estimates attributes of the plants 10 based on the amount of light absorbed by the plants. For example, healthy plants generally absorb more light than diseased plants. Therefore, the brightness of the plants, as measured by the handheld tool 25, corresponds to the general health of the plants 10. However, the handheld tool 25 requires use of at least one hand, and accurate measurement results are predicated on a relatively precise and steady aiming of the tool.

Figure 1C:
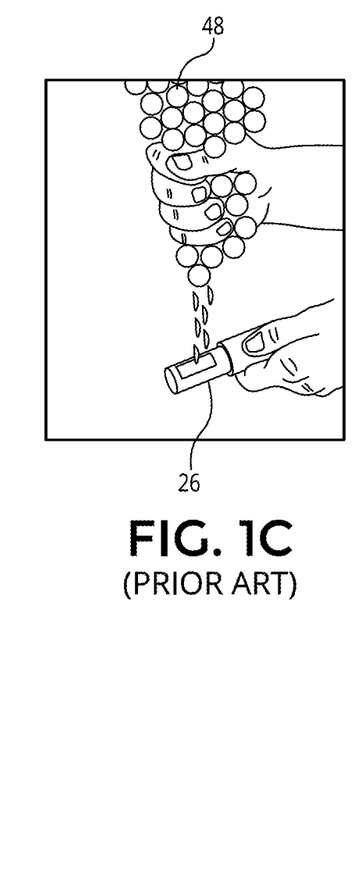
FIG. 1C is a picture of a handheld tool for measuring the content of sugar in accordance with conventional technology.

FIG. 1C is a picture of a handheld tool 26 for measuring the content of sugar in accordance with conventional technology. In operation, fruit 48 is crushed to release juices over the handheld tool 26 (typically referred to as the "brix"). The handheld tool 26 is equipped with suitable sensors to measure the percentage of sugar in the juices that flow over the sensor. However, the illustrated handheld tool requires the use of both hands by the operator. Furthermore, relevant data may only be displayed momentarily on the display, and sometimes must be copied by hand into a paper or digital log together with the plant location and other relevant data.

Therefore, systems and methods are needed that expand the sensing capabilities and information capture of human plant breeders and field scouts.

DESCRIPTION OF THE DRAWINGS

The foregoing aspects and many of the attendant advantages of the inventive technology will become more readily appreciated as the same become better understood by reference to the following detailed description, when taken in conjunction with the accompanying drawings, wherein.

DETAILED DESCRIPTION

While illustrative embodiments have been described, it will be appreciated that various changes can be made therein without departing from the spirit and scope of the inventive technology. Embodiments of the inventive technology are generally applicable to assessing physical attributes of plants in the field (also referred to as "phenotyping"). In some embodiments, unmanned aerial vehicles (UAVs) or unmanned ground vehicles (UGVs) can carry instruments and analysis systems for assessing the attributes of the plants.

In some embodiments, the inventive technology includes performing human observations by a skilled or highly skilled observer (e.g., an experienced agronomist, an experienced field operator, etc.). The skilled observer (also referred to as "skilled operator," "advisor," or "trainer") may carry cameras and sensors, for example, chemical sensors, humidity sensors, acoustic sensors, distance sensors, global positioning system (GPS), and other sensors. At least some sensors may be strapped to the observer's body such that the observer naturally orients the sensors toward the target plants while traversing through a field. While observing plants in the field, the skilled observer may take notes by talking to a recorder or camera. In some embodiments, the observer's natural or instinctive moves can also be recorded. Some examples of such moves are: bending toward a plant, separating the plants, reaching for the plant, kneeling, etc. The exact location of the observer and the time of making the observations can be determined using, for example, a GPS system. The observation records, for example, video clips, may be tagged with metadata that describe the observer's location, time of day, body position of the observer, outside temperature, and other metadata. In some embodiments, the skilled observer may carry augmented reality (AR) and/or virtual reality (VR) equipment, for improved observation of the plants in the field and for collecting data in a hands-free manner.

Once the skilled observer (trainer) surveys the field, the collected material may be organized into instructions for use by another observer ("trainee," e.g., a student or new farmer who may be less skilled than the trainer), or an automated observation system (e.g., a set of sensors and instructions carried by a UGV). The instructions may be created by analyzing the data collected by the sensors, cameras, GPS, trainer's observations, body posture, etc. The data can be organized into audio-visual flows that include specific prompts for the subsequent observers. For example, the instructions may specify type and quantity of fertilizer to be used in a given field or a portion of the field. As another example, the instructions may include a request for capturing an image of a plant to be taken at a specific location.

In operation, the trainee or automated observation system can carry sensors, recording equipment, VR and/or AR while traversing through the field while relying on the instructions generated from observations collected by the earlier skilled observer. For example, the trainee may be prompted to take pictures at places where the skilled operator (trainer) spent more time, bent her body, generated a specific narrative, created a specific record based on specialized tools, or created ground-truth labels (measurements of plant attributes that are considered highly accurate, e.g. plant height measured manually with a yardstick). The hand-held agronomist tool may instruct the trainee what to do (e.g., add fertilizer or water), where to go, or what other observations to make (e.g., take a picture of the strawberries, check the other side of the field, focus on the stalk, etc.).

In some embodiments, the actions or observations taken by the trainee may be used to improve or augment the instruction material. In some embodiments, a handheld device that includes the instruction material and some instruments (e.g., a camera, GPS, etc.) is referred to as a "hand-held agronomist."

Figure 2:
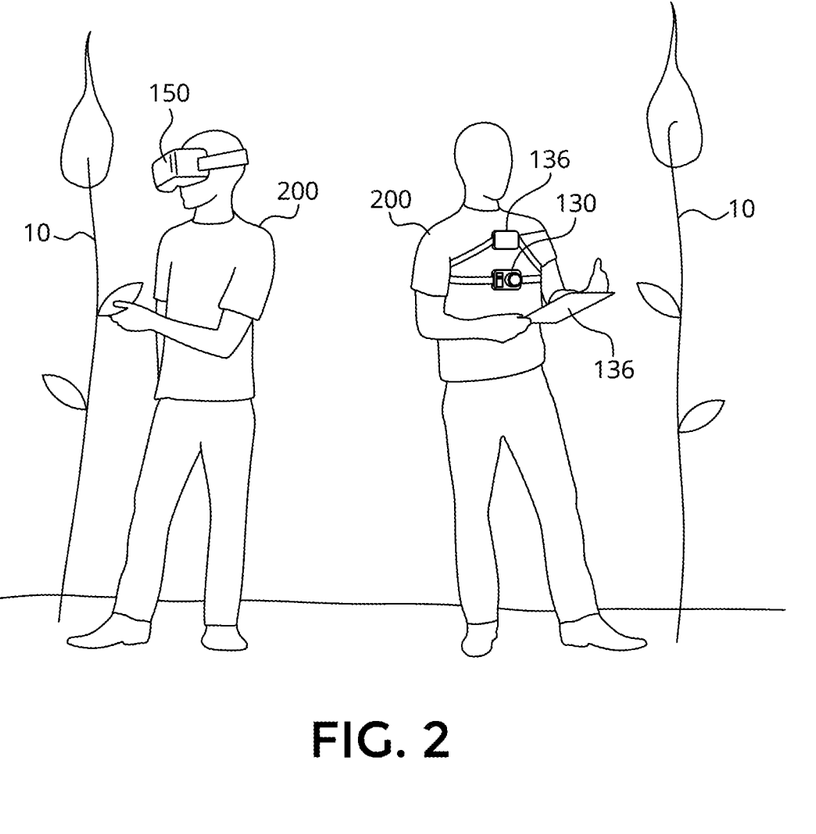
FIG. 2 is a schematic view of an augmented field-inspection system in accordance with embodiments of the present technology.

FIG. 2 is a schematic view of an augmented field-inspection system in accordance with embodiments of the present technology. In some embodiments, one or more trainers 200 (e.g., skilled observers, expert plant breeders, experienced farmers, etc.) observe and document attributes of the plants 10 in the field. The trainers 200 may carry sensors 136 and recording equipment 130, that is either strapped on their body or handheld. The sensors 136 may be humidity sensors, thermometers, wind speed sensors, acoustic sensors, and other sensors. The recording equipment 130 may include cameras operating in different spectra of electromagnetic radiation (e.g., visible light, infrared radiation, ultrasound waves, etc.), voice recorders, motion recorders, accelerometers, and other recording equipment. In some embodiments, while the cameras collect images of the plants 10, the motion recorders may collect trainer's trajectory through the field, the recording equipment may record audio observations made by the trainer, accelerometers may record the position of the trainer's body, etc. Other combinations of the recordings and sensor measurements are possible. The recordings and/or sensor measurements may be cross-related using the location and time metadata based on, for example, GPS signal.

In some embodiments, the trainer 200 may wear an AR/VR system 150 for improved observation and analysis of plants and/or environmental field data. The AR/VR system 150 may facilitate collecting more precise data in a hands-free manner. Collectively, the sensors 136, the recording equipment 130, and the AR/VR system 150 may be referred to as "augmented inspection tools."

In some embodiments, the trainer 200 may record notes based on his or her own expertise, without needing specific sensor measurements. For example, the trainer 200 may make expert observations about the health of the plants, or suggest fertilization or watering. In some instances, the trainer 200 may recognize and record properties of a plant that the sensors 136 or the recording equipment 130 would not capture, for example, the start of a flower or a leaf budding.

Figure 3:
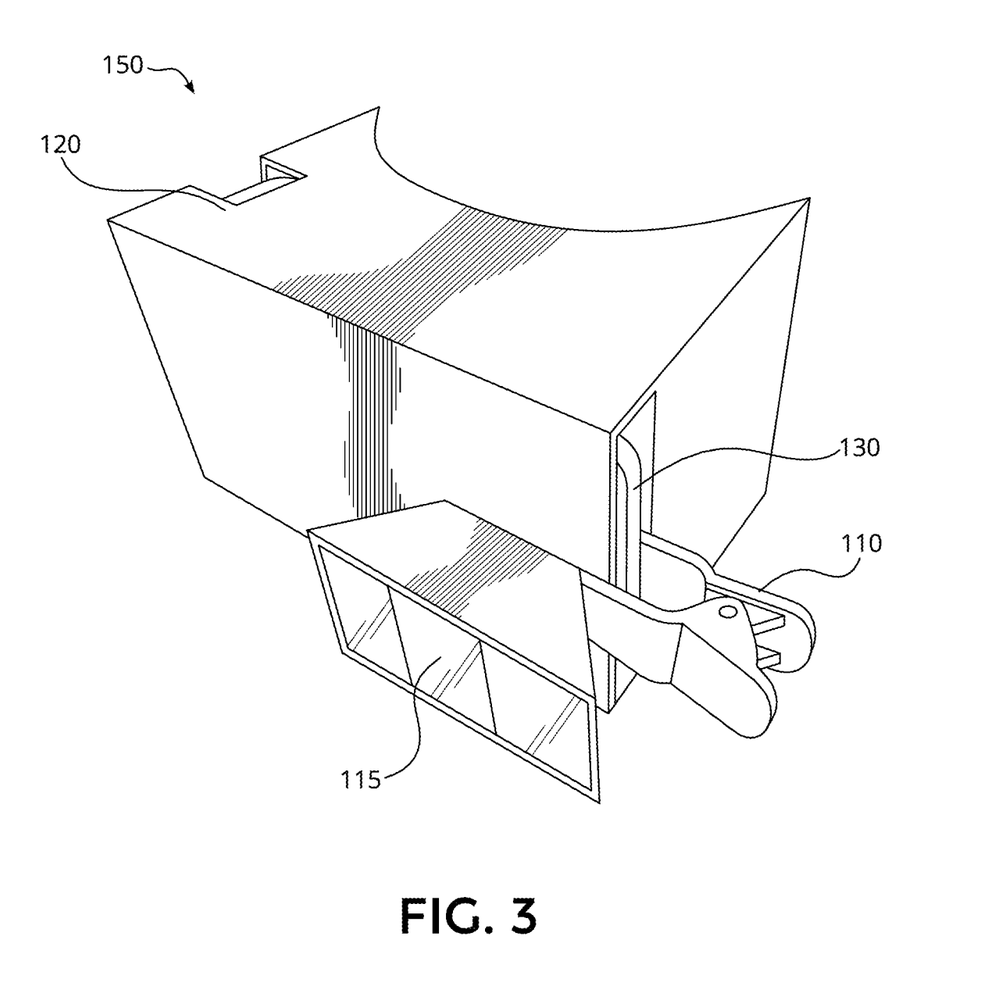
FIG. 3 is an isometric view of a virtual reality system in accordance with embodiments of the present technology.

FIG. 3 is an isometric view of a virtual reality (VR) system in accordance with embodiments of the present technology. In some embodiments, an Augmented Reality (AR) system may be used instead of the VR system. In some embodiments, the VR system 150 includes a camera 130 carried by a housing 120. A non-exclusive example of a suitable camera is the camera in a Nexus 5× smartphone (a Google product available from many retailers) which has been modified to remove the near-infrared filter (e.g., as modified by the company Eigen Imaging). The camera 130 may be inserted into the housing 120 such that the objective lens of the camera 130 aligns with an aperture in the housing 120. In some embodiments, the housing 120 may be made of plastic or cardboard. The VR system 150 may include a mirror-based mono-to-stereo converter 115 that creates a stereo display at the camera 130. In other embodiments, the mono-to-stereo converter may be created within the camera itself or by image post-processing software. The camera 130 and the mono-to-stereo converter 115 may be held together by a connector 110 (e.g., a clip, an adhesive element, or a plug-in connector).

Figure 4A:
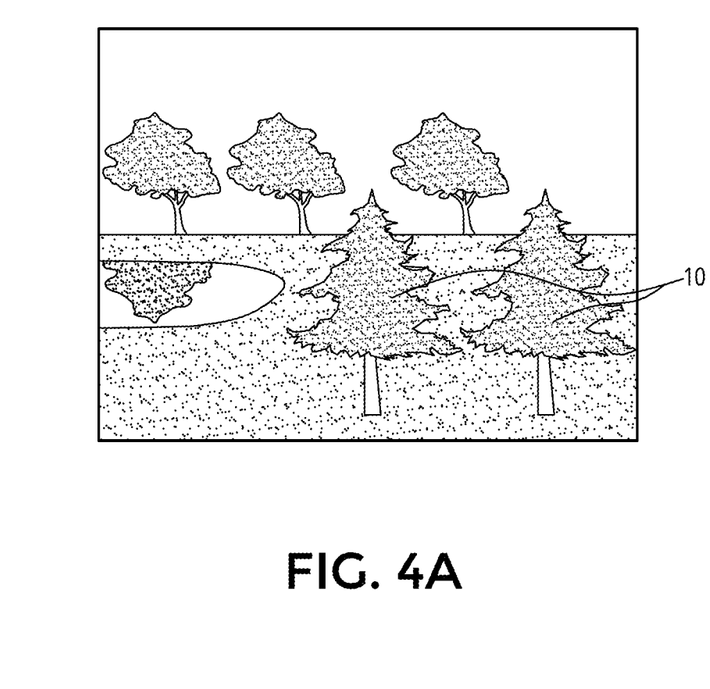
FIGS. 4A and 4B are pictures of plants obtained without and with a virtual reality system, respectively.
Figure 4B:
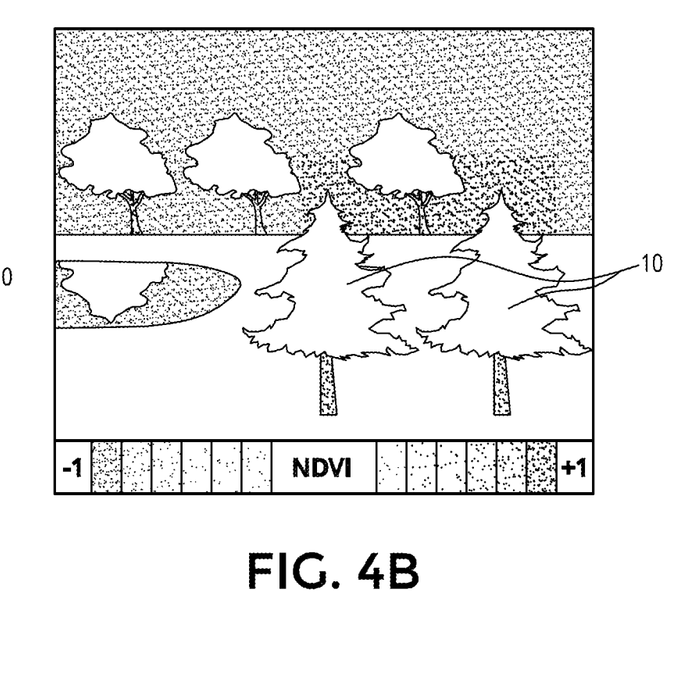

FIGS. 4A and 4B are pictures of plants 10 obtained without and with a VR field-inspection system, respectively. The VR/AR systems may be used by either the trainers or the trainees. FIG. 4A is an image obtained with visible light. FIG. 4B is an image obtained using a combination of visible light (e.g., red light) and infrared light. The composite image in FIG. 4B is sometimes referred to as a normalized difference vegetation index (NDVI). In some embodiments, the NDVI correlates with the stress that the plants experience. Therefore, when relying on images in FIGS. 4A and 4B, the observer (either skilled or less skilled) may derive more accurate conclusions about the plants 10 in comparison to relying on FIG. 4A only.

Plant observations and records collected by the trainers may be processed into instructions for the trainees. These instructions may be created by analyzing and processing data collected by the sensors, cameras, GPS, trainer's observations, body posture, metadata, and other records. Examples of systems for analyzing and processing data are described with reference to FIG. 5 below.

Figure 5:
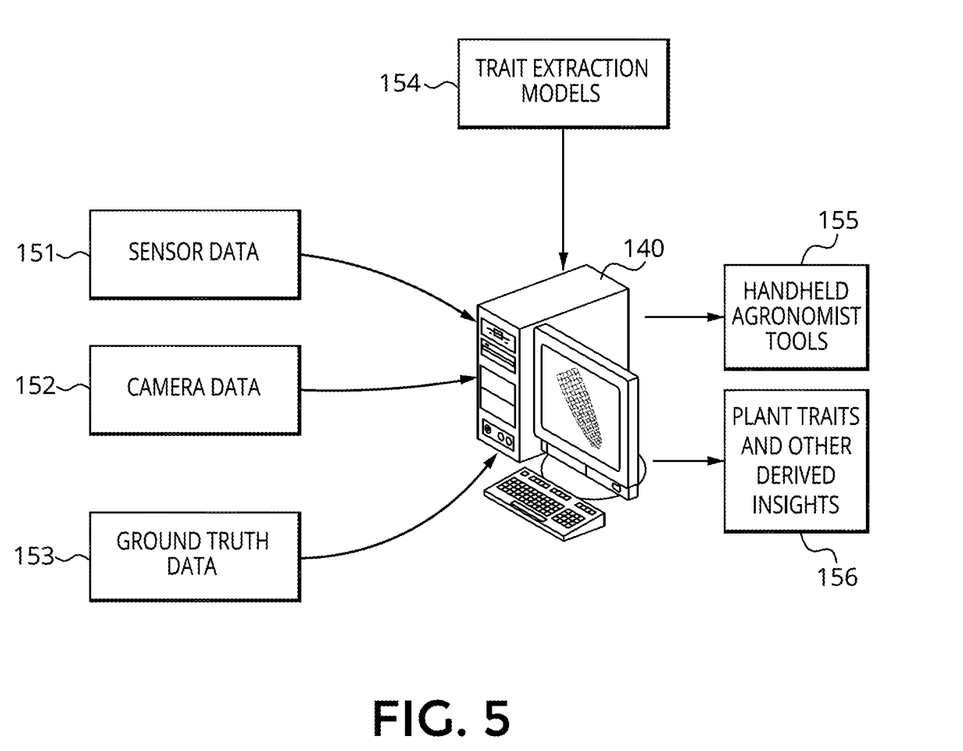
FIG. 5 is a schematic diagram of a system for generating training models in accordance with an embodiment of the present technology.

FIG. 5 is a schematic diagram of a system for generating training models in accordance with an embodiment of the present technology. In the illustrated embodiment, an analysis system 140 receives data collected by trainers. The data may include sensor data 151, camera data 152 and/or ground truth data 153 (e.g., measurements of plant phenotypic traits taken by direct observation with a high confidence in the accuracy of the data, e.g. plant height measured manually with a yardstick by a skilled person).

The analysis system 140 also includes trait extraction models 154, which in some embodiments are trained and improved over time with ground truth data and other data (e.g. synthetic labels). In some embodiments, the trait extraction refers to a process of analyzing raw data to determine observed phenotypic traits with a relatively high degree of confidence using computer models. For example, trait extraction may rely on models that can look at a grape vine and reliably count the number of grapes, estimate the healthiness of the plant based on the coloring of the leaves, estimate the diameter of a stalk, determine the presence or absence of pests, etc. In some embodiments, models include techniques that segment objects present in raw images. In other embodiments, convolutional neural nets (CNN) may be used to analyze images. An example of such CNN is the inception method used for image classification and detection. The inception CNN algorithms may be used, for example, to detect fruit or other features in the image. Recurrent neural nets or other machine learning and deep learning models may extract other useful information from the sensors, cameras, and ground truth data. Some exemplary machine learning and deep learning models are available in software libraries for machine intelligence, for example, TensorFlow that is available as an open-source software library for Machine Intelligence from TensorFlow Community. In some embodiments, natural language processing (NLP) tools may be used to extract information from the recordings created by the skilled observer (e.g., from the audio data having the skilled observer's commentary on the conditions in a certain part of the field or on a specific plant).

The trait extraction models 154 rely on the sensor, camera and ground truth data to generate instruction materials for trainees. The trait extraction models 154 may produce a set of plant traits and other derived insights 156. The plant traits/derived insights 156 may be displayed on a computer screen. In some embodiments, these traits/insights may be fed into additional computer models for plant breeding or management recommendations. In some embodiments, the set of instructions generated by the extraction models 154 and loaded on a computer (e.g., a notebook, a smart phone, etc.) may be referred to as handheld agronomist or a handheld agronomist tool 155. The trainees may use the handheld agronomist tool 155 in the field, as described with reference to FIGS. 6 and 7 below.

Figure 6:
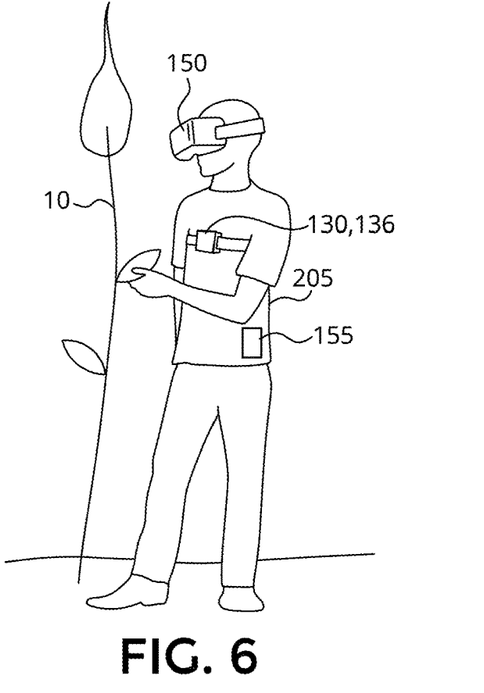
FIGS. 6 and 7 are schematic views of operators with augmented field-inspection systems in accordance with embodiments of the present technology.
Figure 7:
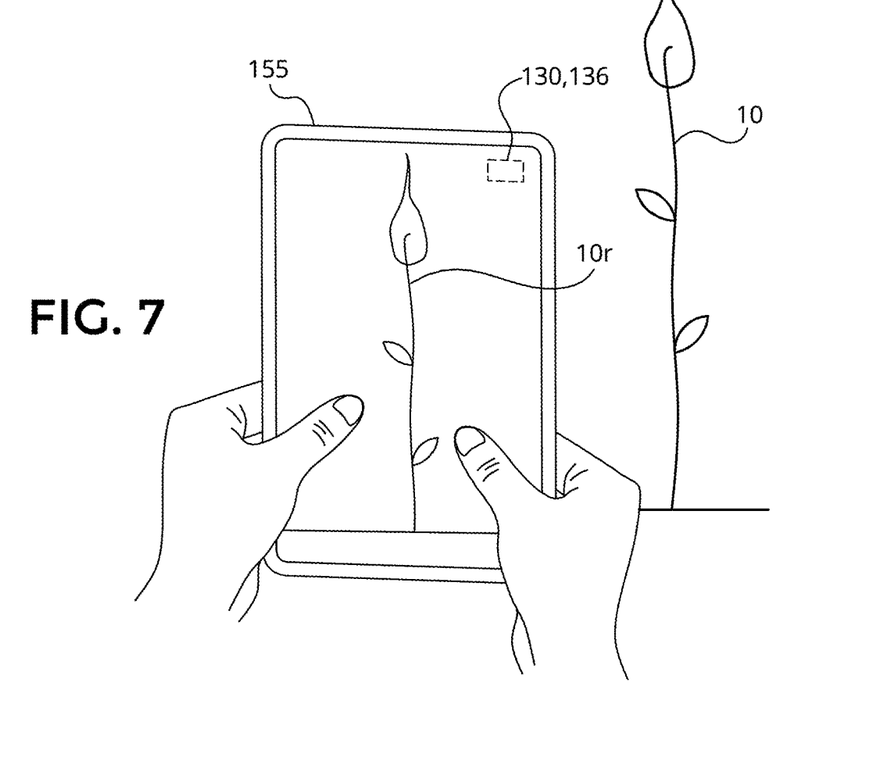

FIGS. 6 and 7 are schematic views of operators with augmented field-inspection systems in accordance with embodiments of the present technology. FIG. 6 illustrates a trainee 205 that carries the AR/VR system 150, the sensors 136, the cameras 130, and the handheld agronomist tool 155. The sensors may be, for example, chemical sensors, humidity sensors, acoustic sensors, distance sensors, GPS, and other sensors. In operation, the trainee may rely on her own physical observations and/or on the cameras and sensors in observing the plants 10. In some embodiments, these observations are improved by the AR/VR system 150.

As the trainee 205 traverses the field, the trainee may receive instructions from the handheld agronomist tool 155. Such instructions may be directed toward treating the plants, for example, "add water" or "add fertilizer." Some instructions may be directed toward making further observations of the plants, for example, "take a picture of the leaf," "turn the chemical sensor toward the fruit," "sample the pest," "turn the video camera toward the roots of the plant," "measure the size of the fruit," and so on. In some embodiments, the additional observations made by the trainee 205 are fed back to the training models to improve the handheld agronomist tool or other instructions for the trainees.

FIG. 7 illustrates the handheld agronomist tool 155 having the built-in camera 130 and/or sensor 136. In some embodiments, the handheld agronomist 155 may be a handheld computer with a camera and sensors (e.g., light sensor, GPS sensor, chemical sensor, etc.), and instruction material. In operation, the trainee may turn the handheld agronomist tool's camera toward the target plant to, for example, compare traits of the plant 10 with traits of a model plant 10r, observe differences between the plants 10 and 10r, and record findings. As another example, the trainee may be prompted to take a picture of the leaf of a plant. Next, the analysis software analyzes the image and generates appropriate instructions for the trainee, for example, "add fertilizer of the type XYZ." Other examples of the instructions for the trainee are also possible.

Figure 8:
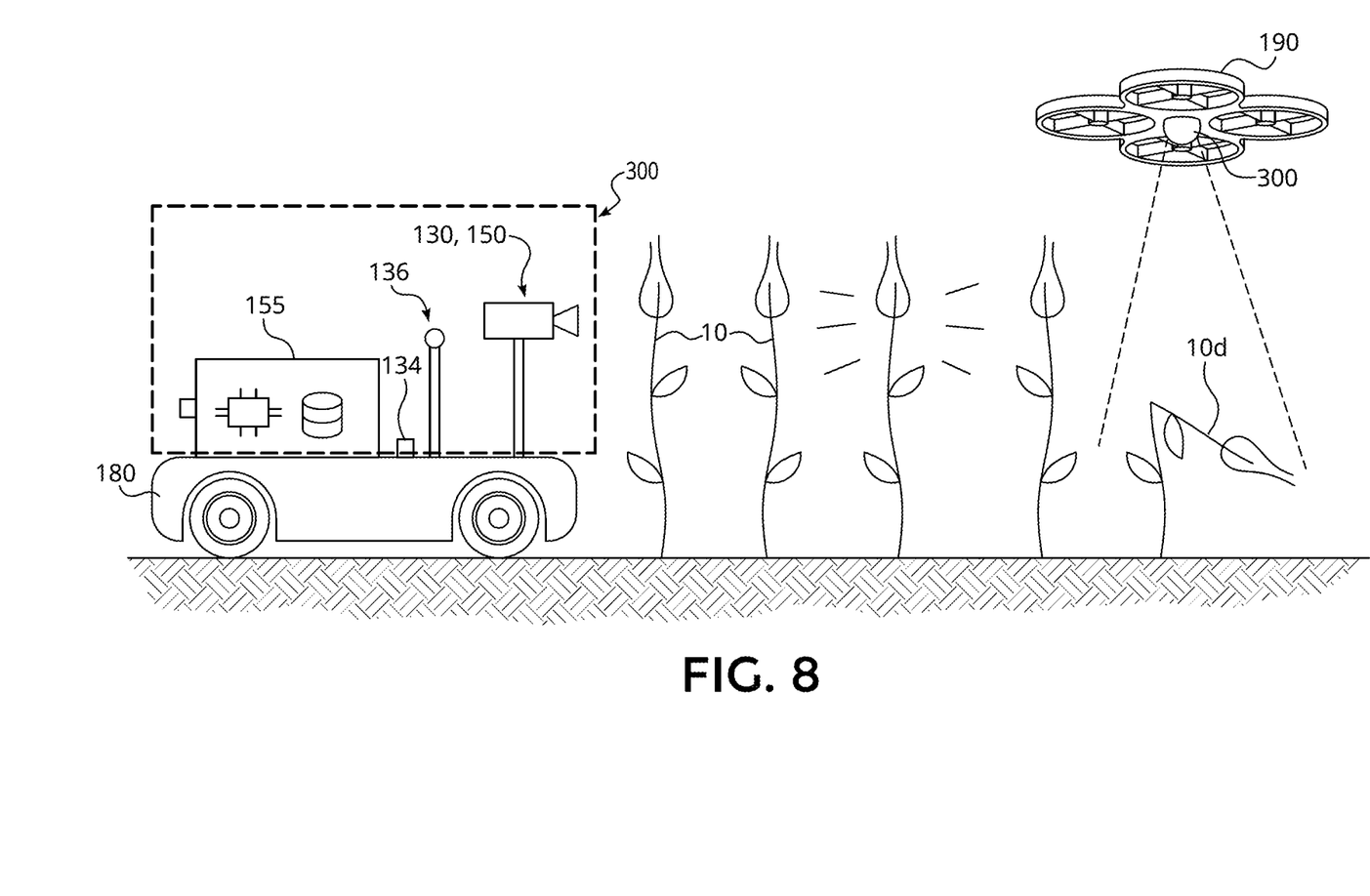
FIG. 8 is a schematic view of a vehicle-based augmented field-inspection system in accordance with embodiments of the present technology.

FIG. 8 is a schematic view of a vehicle-based augmented field-inspection system in accordance with embodiments of the present technology. In some embodiments, instead of the trainee, a UGV 180 may carry an observer system 300 through the field. The observer system 300 may include the cameras 130, the sensors 136, a GPS 134, and the handheld agronomist or other computer system 155 with instructions. In operation, the vehicle-based augmented field-inspection system follows instructions from the computer system 155 to collect information and make records from the cameras and sensors of the observer system 300. In some embodiments, the observer system 300 may be carried by an UAV 190.

Figure 9:
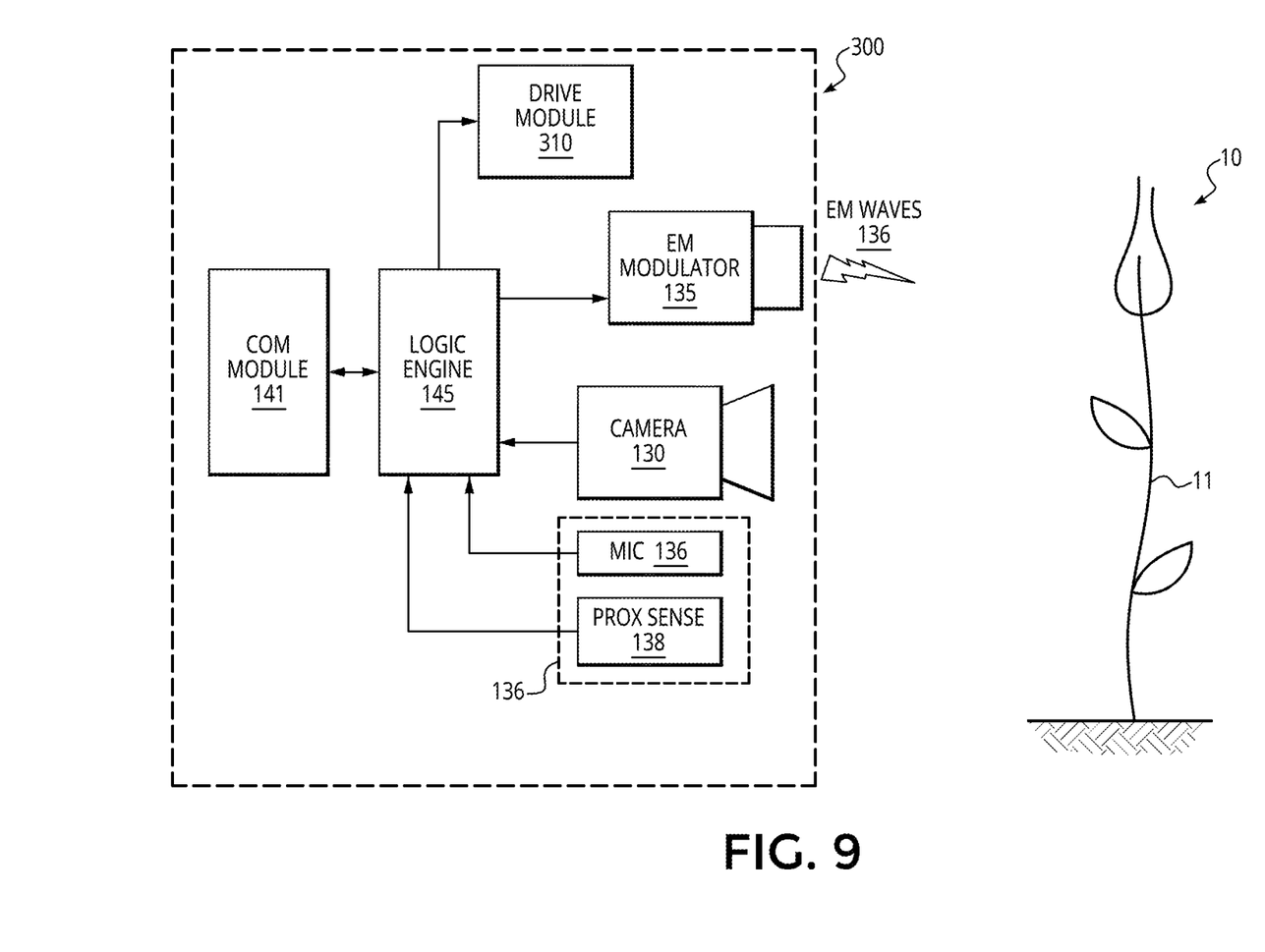
FIG. 9 is a schematic view of an observer system in accordance with an embodiment of the present technology.

FIG. 9 is a schematic view of an observer system in accordance with an embodiment of the present technology. In different embodiments, the observer system 300 can be carried by the trainee, which may be the UGV or the UAV. The observer system 300 includes the camera (recorder) 130 and sensors 136. Some examples of the sensors 136 are an acoustic sensor 136 and a proximity sensor 138. The observer system 300 may include an electromagnetic (EM) modulator that emits EM waves 136 at required frequency (e.g., infrared, mm-wave, visible spectrum, etc.). The frequency of the EM waves 136 may be matched to the sensitivity of the particular camera 130. For example, when instructed to observe a diameter of a stalk 11, the EM modulator may emit visible light that is reflected by the plant, and captured by the camera 130. As another example, the proximity sensor 138 may rely on the laser light emitted by the EM modulator to estimate distance from the plant 10. Other scenarios are possible.

When the observer system 300 is carried by the unmanned vehicle, the system may also include a drive module 310 for directing the unmanned vehicle through the field or above the field. In operation, the observer system 300 may wirelessly communicate with a remote trainer or the analysis system 140 via a communication module 141.

Many embodiments of the technology described above may take the form of computer-executable or controller-executable instructions, including routines stored on non-transitory memory and executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. In many embodiments, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A method for plant phenotyping, comprising:
   acquiring a first set of observations about plants in a field by a trainer, wherein the trainer carries a sensor configured to collect observations about the plants, and wherein the first set of observations includes ground truth data;

recording a body position of the trainer while the trainer is collecting at least one of the first set of observations in the field;

recording a location of the trainer simultaneously with recording the body position;

processing the first set of observations about the plants by a trait extraction model to generate instructions for a trainee; and acquiring a second set of observations about the plants by the trainee while the trainee follows the instructions.

2. The method of claim 1, wherein the trainer carries at least one camera configured to acquire images of the plants.

3. The method of claim 2, wherein the sensor is selected from a group consisting of a chemical sensor, a humidity sensor, an acoustic sensor, a distance sensor, and a GPS.

4. The method of claim 2, wherein the trainer carries a voice recorder, and wherein the first set of observations includes voice comments made in the field by the trainer, the method further comprising:

recording the voice comments by the voice recording equipment.

5. The method of claim 4, wherein the sensor, the camera, and the voice recorder operate simultaneously.

6. The method of claim 1, wherein the body position is at least one of bending toward the plants, reaching for the plants, or kneeling by the plants.

7. The method of claim 1, wherein the location of the trainer is determined at least in part based on a GPS signal.

8. The method of claim 2, wherein processing the trait extraction model comprises convolutional neural nets (CNN) configured to, when executed, analyze images.

9. The method of claim 4, wherein processing the trait extraction model comprises natural language processing (NLP) algorithms configured to, when executed, extract information from the voice comments by the first observer.

10. The method of claim 1, further comprising:

acquiring a second set of observations about the plants by the trainee, wherein the trainee carries an augmented reality (AR) system or a virtual reality (VR) system configured to at least partially display instructions for the trainee; and processing the second set of observations about the plants by the trait extraction model to update the instructions.

11. The method of claim 1, further comprising:

based on the instructions, executing at least one plant treatment by the trainee.

12. The method of claim 1, further comprising:

based on the instructions, emulating the body position of the trainer by the trainee.

13. The method of claim 1, wherein the trainee is an automated observer system carried by an unmanned ground vehicle (UGV).

14. A system for plant phenotyping, comprising:

a handheld agronomist tool including:

a computing device having a memory that carries instructions for collecting observations about plants in a field;

at least one camera for observing the plants;

a first sensor coupled to the computing device and configured to record a body position of a trainer while the trainer collects at least one of a first set of observations in the field; and a second sensor coupled to the computing device and configured to record a location of the trainer simultaneously with recording the body position;

wherein the instructions are generated by a trait extraction model based on processing the first set of observations about the plants collected by a trainer, wherein the instructions instruct a trainee to observe the plants or to execute plant treatments.

15. The system of claim 14, wherein the handheld agronomist further comprises a third sensor for collecting observations of the plants, and wherein the third sensor is one of a chemical sensor, a humidity sensor, an acoustic sensor, and a distance sensor.

16. The system of claim 15, wherein the trainee carries an augmented reality (AR) system or a virtual reality (VR) system configured to at least partially display instructions for the trainee.

17. The system of claim 15, wherein the trainee is an unmanned aerial vehicle (UAV), and wherein the handheld agronomist is carried by the UAV.

18. The system of claim 15, wherein the trainee is an unmanned ground vehicle (UGV), and wherein the handheld agronomist is carried by the UGV.

19. The system of claim 18, wherein the camera is a first camera, the system further comprising:

a second camera configured to operate in a range of wavelengths of electromagnetic (EM) radiation; and an EM modulator that emits EM waves in the range of wavelengths.

20. The system of claim 18, further comprising an analysis system configured to execute the trait extraction model.

* * * * *